United States Patent [19]

Crouch et al.

[11] 4,038,261
[45] July 26, 1977

[54] PRODUCTION OF BRANCHED ARYLENE SULFIDE POLYMERS

[75] Inventors: Willie W. Crouch; James T. Edmonds, Jr., both of Bartlesville, Okla.

[73] Assignee: Phillips Petroleum Company, Bartlesville, Okla.

[21] Appl. No.: 581,334

[22] Filed: May 27, 1975

[51] Int. Cl.$^2$ .............................................. C08G 75/16
[52] U.S. Cl. ...................................... 260/79.1; 260/79
[58] Field of Search ................................ 260/79, 79.1

[56] References Cited

U.S. PATENT DOCUMENTS

| | | | |
|---|---|---|---|
| 3,562,199 | 2/1971 | Hill, Jr. et al. | 260/79 |
| 3,607,843 | 9/1971 | Vidaurri | 260/79 |
| 3,699,087 | 10/1972 | Wood et al. | 260/79 |
| 3,725,362 | 4/1973 | Walker | 260/79 |
| 3,763,124 | 10/1973 | Edmonds, Jr. | 260/79 |
| 3,786,035 | 1/1974 | Scoggin | 260/79 |
| 3,919,177 | 11/1975 | Campbell | 260/79 |

*Primary Examiner*—Melvyn I. Marquis

[57] ABSTRACT

A method is provided for producing branched arylene sulfide polymers by contacting at least one p-dihalobenzene, at least one polyhalo aromatic compound having more than two halogen substituents per molecule, at least one alkali metal sulfide, at least one lithium carboxylate or lithium chloride, N-methyl-2-pyrrolidone, and at least one alkali metal hydroxide. The use of the polyhalo aromatic compound, which is employed in minor amounts, results in a polymer of reduced melt flow, which, without prior curing, can be molded, extruded, or spun into fibers.

14 Claims, No Drawings

PRODUCTION OF BRANCHED ARYLENE SULFIDE POLYMERS

BACKGROUND OF THE INVENTION

This invention relates to the production of arylene sulfide polymers. In one of its aspects this invention relates to the production of branched arylene sulfide polymers and to the novel polymers produced. In another of its aspects this invention relates to the production of arylene sulfide polymers having lower melt flow by the use of a specific chemical compound in the reaction mixture than can be produced within the use of the specific chemical compound. In yet another of its aspects this invention relates to the use of polyhalo aromatic compounds having more than two halogen substituents per molecule in the reaction mixture in the production of arylene sulfide polymers.

In U.S. Pat. No. 3,354,129, the disclosure of which is incorporated herein by reference, there is disclosed a method of producing polymers from polyhalo-substituted aromatics, alkali metal sulfides and polar organic compounds. The preparation of arylene sulfide polymers having reduced melt flow before the polymers are cured as compared to the arylene sulfide polymers known in the art as of particular interest since this reduced melt flow permits the use of the polymers without curing for end products requiring higher molecular weight, such as fiber production, for which most of the arylene sulfide polymers previously produced required curing.

It is therefore an object of this invention to produce arylene sulfide polymers of lower melt flow as compared to those polymers produced by prior art methods. It is also an object of this invention to produce branched arylene sulfide polymers of reduced melt flow as compared to arylene sulfide polymers produced by similar methods in the prior art.

Other aspects, objects and the various advantages of this invention will be apparent on reading the specification and the appended claims.

STATEMENT OF THE INVENTION

In accordance with this invention, a branched arylene sulfide polymer is prepared by contact at least one p-dihalobenzene, at least on polyhalo aromatic compound having more than two halogen substituents per molecule, at least one alkali metal sulfide, at least one lithium carboxylate or lithium chloride, N-methyl-2-pyrrolidone, and at least one alkali metal hydroxide. Use of the polyhalo aromatic compound, which must be employed in minor amounts as hereinafter described, results in a polymer of reduced melt flow which, without prior curing, can be molded, extruded, or spun into fibers. Although arylene sulfide polymers of similarly low melt flow can be produced by the general method of U.S. Pat. No. 3,354,129, using a relatively large amount of polyhalo aromatic compound having more than two halogen substituents, the branched polymers of the instant invention can be fabricated into products having properties superior to products fabricated from branched polymers prepared by the method of said patent. For example, products fabricated from the branched polymers produced by the process of the instant invention are stronger, tougher, more flexible, and capable of better physical property retention at elevated temperatures than are products fabricated from the branched polymers produced by the process of said patent.

In one embodiment of the present invention, a mixture of at least one p-dihalobenzene and at least one polyhalo aromatic compound having more than two halogen substituents per molecule is reacted, in the presence of at least one lithium salt selected from lithium carboxylates and lithium chloride, under polymerization conditions for a period of time sufficient to form an arylene sulfide polymer having a melt flow as described hereinafter, with a mixture produced by dehydration of an admixture of at least one alkali metal sulfide in hydrated form or as an aqueous mixture, at least one alkali metal hydroxide, and N-methyl-2-pyrrolidone.

In another embodiment of this invention, a mixture of at least one p-dihalobenzene and at least one polyhalo aromatic compound having more than two halogen substituents per molecule is reacted, under polymerization conditions for a period of time sufficient to form an arylene sulfide polymer having a melt flow as described hereinafter, with a mixture produced by dehydration of an admixture of at least one alkali metal sulfide in hydrated form or as an aqueous mixture, at least one lithium carboxylate, at least one alkali metal hydroxide, and N-methyl-2-pyrrolidone.

p-Dihalobenzenes which can be employed in the process of this invention can be represented by the formula

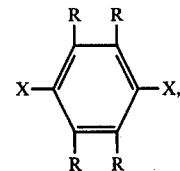

where each X is selected from the group consisting of chlorine and bromine, preferably chlorine, and each R is selected from the group consisting of hydrogen and methyl, with the proviso that in at least 80 mole percent of the p-dihalobenzene employed each R must be hydrogen.

Examples of some p-dihalobenzenes which can be employed in the process of this invention include p-dichlorobenzene, p-dibromobenzene, 1-chloro-4-bromobenzene, 2,5-dichlorotoluene, 2,5-dibromotoluene, 2,5-dichloro-p-xylene, 2,5-dibromo-p-xylene, 1-chloro-2,3,5-trimethyl-4-bromobenzene, 1,4-dichloro-2,3,5,6-tetramethylbenzene, and the like, and mixtures thereof.

Polyhalo aromatic compounds having more than two halogen substituents per molecule which can be employed in the process of this invention can be represented by the formula $R'X_n$, where each X is selected from the group consisting of chlorine and bromine, preferably chlorine, $n$ is an integer of 3 to 6, and $R'$ is a polyvalent aromatic radical of valence $n$ which can have up to about 4 methyl substituents, the total number of carbon atoms in $R'$ being within the range of 6 to about 16.

Examples of some polyhalo aromatic compounds having more than two halogen substituent per molecule which can be employed in the process of this invention include 1,2,3-trichlorobenzene, 1,2,4-trichlorobenzene, 1,3-dichloro-5-bromobenzene, 2,4,6-trichlorotoluene, 1,2,3,5-tetrabromobenzene, hexaclorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include lithium sulfide, sodium sulfide, potassium sulfide, rubidium sulfide, cesium sulfide, and mixtures thereof. As stated previously, the alkali metal sulfide should be used in hydrated form or as an aqueous mixture.

Lithium carboxylates which can be employed in the process of this invention can be represented by the formula R"CO$_2$Li, where R" is an alkyl radical having 1 to about 6 carbon atoms or a phenyl radical. If desired, the lithium carboxylate can be employed as a hydrate.

Examples of some lithium carboxylates which can be employed in the process of this invention include lithium acetate, lithium propionate, lithium 2-methylpropionate, lithium butyrate, lithium 3-methylbutyrate, lithium valerate, lithium hexanoate, lithium heptanoate, lithium benzoate, and the like, and mixtures thereof.

Alkali metal hydroxides which can be employed in the process of this invention include lithium hydroxide, sodium hydroxide, potassium hydroxide, rubidium hydroxide, cesium hydroxide, and mixtures thereof.

Although the mole ratio of p-dihalobenzene to alkali metal sulfide can vary somewhat, generally it will be within the range of about 1:1 to about ,1.1:1, preferably about 1.01:1 to about 1.04:1, depending in part on the nature and amount of the polyhalo aromatic compound having more than two halogen substituents per molecule which is employed. The amount of polyhalo aromatic compound having more than two halogen substituents per molecule can vary considerably, depending in part on the halogen content of said polyhalo aromatic compound, but generally will be within the range of about 0.05 to about 0.6, preferably about 0.1 to about 0.4, part by weight per 100 parts by weight p-dihalobenzene when the lithium salt selected from lithium carboxylates and lithium chloride is a lithium carboxylate, and about 0.12 to about 0.8, preferably about 0.15 to about 0.6, part by weight per 100 parts by weight p-dihalobenzene when the lithium salt selected from lithium carboxylates and lithium chloride is lithium chloride. Although the mole ratio of lithium salt selected from lithium carboxylates and lithium chloride to alkali metal sulfide can vary over a considerable range, generally it will be within the range of about 0.4:1 to about 2:1, preferbly about 0.5:1 to about 1.2:1. The mole ratio of alkali metal hydroxide to alkali metal sulfide can vary over a wide range but generally will be within the range of about 0.05:1 to about 0.5:1, preferably about 0.07:1 to about 0.2:1. The amount of N-methyl-2-pyrrolidone can vary considerably, generally being within the range of about 200 to about 1000, preferably about 300 to about 600, grams per gram-mole of alkali metal sulfide.

Although the reaction temperature at which the polymerization is conducted can vary over a considerable range, generally it will be within the range of about 220° C to about 280° C, preferably about 240° C to about 270° C. The reaction time can vary greatly, depending in part on the reaction temperature, but generally will be within the range of about 1 hour to about 3 days, preferably about 2 hours to about 8 hours. The pressure should be sufficient to maintain the p-dihalobenzene, the polyhalo aromatic compound having more than two halogen substituents per molecule, and the N-methyl-2-pyrrolidone substantially in the liquid phase.

The dehydration step employed in the process of this invention can be conducted readily by a simple distillation of water.

Although the polyhalo aromatic compound having more than two halogen substituents per molecule can be charged to the polymerization reactor at substantially the same time as the p-dihalobenzene, it is also within the scope of this invention to add said polyhalo aromatic compound, incrementally or all at once, to the polymerization reactor during the course of the polymerization, after polymerization of the p-dihalobenzene has begun.

The branched arylene sulfide polymers produced by the process of this invention can be separated from the reaction mixture by conventional procedures, e.g., by filtration of th polymer, followed by washing with water, or by dilution of the reaction mixture with water, followed by filtration and water washing of the polymer.

The melt flow of the branched arylene sulfide polymers produced by the method of this invention should be within the range of about 1 to about 700, preferably about 2 to about 200 (determined by the method of ASTM D 1238-70, modified to a temperature of 316° C using a 5-kg weight, the value being expressed as g/10 min), since such polymers can be fabricated, without prior curing, into shaped products having desirable properties. Thus, the usualcuring step to which poly(p-phenylene sulfide) is subjected is obviated. Therefoe without prior curing, the branched polymers produced by the process of this invention can be extruded into sheet, film, pipe, or profiles, spun into fibers, or blow molded, injection molded, rotational molded, or compression molded into desired shapes. The branched polymers also can be used in the production of coatings. If desired, the branched polymers can be blended with fillers, pigments, extenders, other polymers, and the like. For example, fiber glass can be added to the polymers to improve physical properties such as tensile strength, flexural modulus, and impact resistance. If desired, the polymers in shaped form can be annealed to improve physical properties such as flexural modulus, flexural strength, tensile strength, and heat deflection temperature.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4g/100 ml solution.

EXAMPLES I-V

In a series of runs employing lithium acetate dihydrate and sodium hydroxide, poly(phenylene sulfide), henceforth referred to as PPS, which was branched except in the control run in which no 1,2,4-trichlorobenzene (TCB), was used, was prepared in the following manner. Sodium sulfide (983.7 g, 60 percent assay, 7.56 moles), lithium acetate dihydrate (765 g, 7.50 moles), sodium hydroxide (46.8 g, 1.17 moles), and N-methyl-2-pyrrolidone (3000 ml, 3078 g) were charged to a stirred 2-gallon autoclave, which was then flushed with nitrogen. In each of the runs the mixture was then dehydrated by heating to 400° –405° F (204° –207° C), giving a distillate comprising primarily water. To the residual mixture were charged 1137 g (7.73 moles) p-dichlorobenzene (DCB), TCB in an amount varying from 0 to 4.0 g, and 500 ml (513 g) N-methyl-2-pyrrolidone. The resulting mixture was heated for 3 hours at 510° F (266° C) at a maximum pressure within the range of 165–175 psig. The reaction product was cooled, washed with water, and dried to obtain the PPS. Yield, melt flow, and inherent viscosity of the PPS produced in each of the runs are shown in Table I.

Table I

| Example | TCB g | TCB g/100g DCB | PPS Yield, g | PPS Melt Flow | PPS Inherent Viscosity |
|---|---|---|---|---|---|
| I | 0 | 0 | 643 | 214 | 0.29 |
| II[a] | 1.0 | 0.09 | 707 | 95 | 0.32 |
| III[a] | 2.0 | 0.18 | 696 | 51 | 0.34 |
| IV[b] | 3.0 | 0.26 | 668 | 19 | 0.36 |
| V[a] | 4.0 | 0.35 | 701 | 4 | 0.43 |

[a]A sample of this polymer, without prior curing, was spun into a fiber.
[b]A sample of polymer (melt flow, 25; inherent viscosity, 0.33) from another run conducted in like manner, without prior curing, was spun into a fiber.

Thus, the branched PPS produced in Examples II through V, conducted within the scope of the process of this invention, was of much lower melt flow than the linear PPS produced in Example I, a control run outside the scope of this invention in which TCB was not employed.

EXAMPLES VI–X

In a series of runs employing lithium chloride and sodium hydroxide, PP, which was branched except in the control run in which no TCB was used, was prepared by the following procedure. Sodium sulfide (983.7 g, 60 percent assay, 7.56 moles), sodium hydroxide (23.4 g, 0.59 mole), and N-methyl-2-pyrrolidone (2550 ml, 2565 g) were charged to a stirred 2-gallon autoclave, which was then flushed with nitrogen. In each of the runs the mixture was then dehydrated by heating to 405° –410° F (207° –210° C), giving a distillate comprising primarily water. To the residual mixture was charged 160 g (3.77 moles) lithium chloride, 1000 ml (1026 g) N-methyl-2-pyrrolidone, 1137 g (7.73 moles) DCB, and TCB in an amount varying from 0 to 4.0 g. The resulting mixture was heated for 3 hours at 510° F (266° C) at a maximum pressure within the range of 130–150 psig. The reaction product was cooled, washed with water, and dried to obtain the PPS. Yield, melt flow, and inherent viscosity of the PPS produced in each of the runs are shown in TABLE II.

Table II

| Example | TCB g | TCB g/100g DCB | PPS Yield, g | PPS Melt Flow | PPS Inherent Viscosity |
|---|---|---|---|---|---|
| VI | 0 | 0 | 590 | 341 | 0.23 |
| VII | 1.0 | 0.09 | 600 | 431[a] | 0.27 |
| VIII | 2.0 | 0.18 | 584 | 186 | 0.28 |
| IX | 3.0 | 0.26 | 590 | 105 | 0.28 |
| X | 4.0 | 0.35 | 663 | 83 | 0.32 |

[a]This value is believed to be in error, particularly in view of the higher inherent viscosity of the polymer as compared with the inherent viscosity of the polymer in Example VI, the control run.

Thus, the branched PPS produced in Examples VIII through X, conducted within the scope of the process of this invention, was of much lower melt flow than the linear PPS produced in Example VI, a control run outside the scope of this invention in which TCB was not employed.

EXAMPLE XI

In the preparation of a branched PPS in a control run outside the scope of this invention, by the general method of U.S. Pat. No. 3,354,129, 983.7 g (60 percent assay, 7.56 moles) sodium sulfide and 3000 ml (3078 g) N-methyl-2-pyrrolidone were charged to a stirred 2-gallon autoclave, which was then flushed with nitrogen. Dehydration of the mixture by heating to 400° F (204° C) gave a distillate comprising primarily water. To the residual mixture were charged 1097 g (7.46 moles) DCB, 32.7g (0.18 mole) TCB, and 500 ml (513 g) N-methyl-2-pyrrolidone. The resulting mixture was heated for 3 hours at 475° F (246° C) at a maximum pressure of 150 psig. The reaction product was cooled, washed with water, and dried to obtain 748 g of branched PPS having a melt flow of 34 and an inherent viscosity of 0.23.

EXAMPLE XII

The branched PPS produced in Example XI was blended with branched PPS produced in three other runs conducted in essentially the same manner. The resulting blend was then pelletized to give a product (Polymer A) having a melt flow of 11. The branched PPS produced in Example IV was blended with branched PPS produced in six other runs conducted in essentially the same manner. (In some runs the maximum reaction pressure during polymerization was 190 psig). This blend was then pelletized to give a product (Polymer B) having a melt flow of 15. Without prior curing, samples of Polymers A and B were injection molded at 550° –600° F (288° –316° C) at a pressure of 8000–9000 psi, using a reciprocating screw injection molding machine. Physical properties were then determined on these molded samples, as well as on molded samples of Polymer B which were annealed by heating for 3 hours at 400° F (204° C). The results of these tests are shown in Table III.

Table III

|  | Polymer A Not Annealed | Polymer B Not Annealed | Polymer B Annealed |
|---|---|---|---|
| Flexural Modulus, psi × $10^{-3}$[a] | 442 | 376 | 519 |
| Flexural Strength, psi[a] | 11770 (break) | 13760 (yield) | 20120 (break) |
| Tensile Strength, psi[b] | 4770 (break) | 8930 (yield) | 12650 (break) |
| Elongation, %[b] | 2 | 32 | 6 |
| Izod Impact Strength ft-lb/in notch[c] | 0.22 | 0.53 | 0.42 |
| Izod Impact Strength, ft-lb/in (no notch)[d] | 1.35 | 14.7 | 10.0 |
| Heat Deflection Temperature, ° C at 264 psi[e] | 74 | 90 | 120 |

[a]ASTM D 790-70.
[b]ASTM D 638-68.
[c]ASTM D 256-70.
[d]ASTM D 256-70, except without notch.
[e]ASTM D 648-56.

As shown in Table III, molded samples of Polymer B, the branched PPS produced by the process of this invention, possessed a much better balance of properties than did molded samples of Polymer A, the branched PPS of similar melt flow produced by a process of the prior art. Comparison of the properties of the molded samples not subjected to annealing shows that Polymer B, when molded, was stronger, based on tensile strength and flexural strength; more flexible, based on elongation; tougher, based on Izod impact strength and on tensile strength and elongation; and capable of better physical property retention at elevated temperatures, based on heat deflection temperature. Table III also shows that when molded samples of Polymer B were annealed, flexural modulus, flexural strength, tensile strength, and heat deflection temperature increased.

A sample of Polymer B, without prior curing, was spun into a fiber.

We claim:
1. A method of producing polymers comprising:
   a. forming a composition by contacting at least one p-dihalobenzene, at least one polyhalo aromatic compound having more than two halogen substituents per molecule, at least one alkali metal sulfide, at least one lithium salt chosen from lithium carboxylate and lithium chloride, N-methyl-2-pyrrolidone, and at least one alkali metal hydroxide, and
   b. maintaining at least a portion of said composition at polymerization conditions to produce a polymer.
2. A method of claim 1 wherein a first composition is prepared by contacting:
   a. at least one alkali metal sulfide, at least one alkali metal hydroxide and N-methyl-2-pyrrolidone,
   b. dehydrating said first composition to form a dehydrated first composition, and
   c. contacting at least one p-dihalobenzene, at least one polyhalo aromatic compound having more than two halogen substituents per molecule, and at least one lithium salt chosen from lithium carboxylate and lithium chloride with said first dehydrated composition maintained under polymerizaion conditions for a period of time sufficient to form an arylene sulfide polymer.
3. A method of claim 1 wherein a first composition is prepared by contacting:
   a. at least one alkali metal sulfide, at least one lithium carboxylate, at least one alkali metal hydroxide and N-methyl-2-pyrrolidone,
   b. dehydrating said first composition to form a dehydrated first composition, and
   c. contacting said dehydrated first composition with at least one p-dihalobenzene and at least one polyhalo aromatic compound having more than two halogen substituents per molecule under polymerization conditions for a period of time sufficient to form an arylene sulfide polymer.
4. A method of claim 1 wherein said p-dihalobenzene is represented by the formula

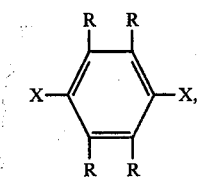

where each X is selected from the group consisting of chlorine and bromine and each R is selected from the group consisting of hydrogen and methyl, with the proviso that in at least 80 mole percent of the p-dihalobenzene employed each R must be hydrogen and the polyhalo aromatic having more than two halogen substituents per molecule is represented by the formula R'X$_n$, where each X is selected from the group consisting of chlorine and bromine, $n$ is an integer of 3 to 6, and R' is a polyvalent aromatic radical of valence n which can have up to about 4 methyl substituents with the total number of carbon atoms in R' being within the range of about 6 to about 16.

5. A method of claim 2 wherein said p-dihalobenzene is represented by the formula

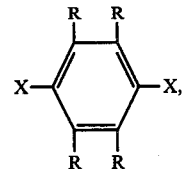

where each X is selected from the group consisting of chlorine and bromine and each R is selected from the group consisting of hydrogen and methyl, with the proviso that in at least 80 mole percent of the p-dihalobenzene employed each R must be hydrogen and the polyhalo aromatic compound having more than two halogen substituents per molecule is represented by the formula R'X$_n$, where each X is selected from the group consisting of chlorine and bromine, $n$ is an integer of 3 to 6, and R' is a polyvalent aromaxic radical of valence n which can have up to about 4 methyl substituents, with the total number of carbon atoms in R' being within the range of about 6 to about 16.

6. A method of claim 3 wherein said p-dihalobenzene is represented by the formula

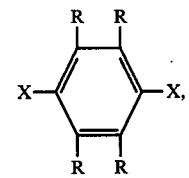

where each X is selected from the group consisting of chlorine and bromine and each R is selected from the group consisting of hydrogen and methyl, with the proviso that in at least 80 mole percent of the p-dihalobenzene employed each R must be hydrogen and the polyhalo aromatic compound having more than two halogen substituents per molecule is represented by the formula R'X$_n$, where each X is selected from the group consisting of chlorine and bromine, n is an integer of 3 to 6, and R' is a polyvalent aromatic radical of valence n which can have up to about 4 methyl substituents, with the total number of carbon atoms in R' being within the range of about 6 to about 16.

7. A method of claim 1 wherein the lithium salt is a lithium carboxylate, the mole ratio of p-dihalobenzene to alkali metal sulfide is within the range of about 1:1 to about 1.1:1, the amount of polyhalo aromatic compound having more than two halogen substituents per molecule is within the range of about 0.05 to about 0.6 part by weight per 100 parts by weight of p-dihalobenzene, the mole ratio of lithium carboxylate to alkali metal sulfide is within the range of about 0.4:1 to about 2:1 and the mole ratio of alkali metal hydroxide to alkali metal sulfide is within the range of about 0.05:1 to about 0.5:1.

8. The method of claim 1 wherein the lithium salt is lithium chloride, the mole ratio of p-dihalobenzene to alkali metal sulfide is within the range of about 1:1 to about 1.1:1, the amount of polyhalo aromatic compound having more than two halogen substituents per molecule is within the range of about 0.12 to about 0.8 by weight per 100 parts by weight p-dihalobenzene, the mole ratio of lithium chloride to alkali metal sulfide is within the range of about 0.4:1 to about 2:1 and the mole ratio of alkali metal hydroxide to alkali metal sulfide is within the range of about 0.05:1 to about 0.5:1.

9. A method of claim 2 wherein the lithium salt is a lithium carboxylate, the mole ratio of p-dihalobenzene to alkali metal sulfide is within the range of about 1:1 to about 1.1:1, the amount of polyhalo aromatic compound having more than two halogen substituents per molecule is within the range of about 0.05 to about 0.6 part by weight per 100 parts by weight p-dihalobenzene, the mole ratio of lithium carboxylate to alkali metal sulfide is within the range of about 0.4:1 to about 2:1 and the mole ratio of alkali metal hydroxide to alkali metal sulfide is within the range of about 0.05:1 to about 0.5:1.

10. A method of claim 2 wherein the lithium salt is lithium chloride, the mole ratio of p-dihalobenzene to alkali metal sulfide is within the range of about 1:1 to about 1.1:1, the amount of polyhalo aromatic compound having more than two halogen substituents per molecule is within the range of about 0.12 to about 0.8 part by weight per 100 parts by weight p-dihalobenzene, the mole ratio of lithium chloride to alkali metal sulfide is within the range of about 0.4:1 to about 2:1 and the mole ratio of alkali metal hydroxide to alkali metal sulfide is within the range of about 0.05:1 to about 0.5:1.

11. A method of claim 3 wherein the mole ratio of p-dihalobenzene to alkali metal sulfide is within the range of about 1:1 to about 1.1:1, the amount of polyhalo aromatic compound having more than two halogen substituents per molecule is within the range of about 0.05 to about 0.6 part by weight per 100 parts by weight p-dihalobenzene, the mole ratio of lithium carboxylate to alkali metal sulfide is within the range of about 0.4:1 to about 2:1 and the mole ratio of alkali metal hydroxide to alkali metal sulfide is within the range of about 0.05:1 to about 0.5:1.

12. A method of claim 1 wherein the polymerization conditions are: reaction temperature within the range of about 220° C to about 280° C, pressure sufficient to maintain the p-dihalobenzene, the polyhalo aromatic compound having more than two halogen substituents per molecule and the N-methyl-2-pyrrlidone substantially in the liquid phase, and a reaction time within the range of about 1 hour to about 3 days.

13. A method of claim 11 wherein the p-dihalobenzene is p-dichlorobenzene, the polyhalo aromatic compound is 1,2,4-trichlorobenzene, the alkali metal sulfide is sodium sulfide, the lithium carboxylate is lithium acetate dihydrate, and the alkali metal hydroxide is sodium hydroxide, the reaction is carried out at a temperature within the range of about 240° C to about 270° C for a reaction time within the range of about 2 hours to about 8 hours.

14. The method of claim 10 wherein the p-dihalobenzene is p-dichlorobenzene, the polyhalo aromatic compound is 1,2,4-trichlorobenzene, the alkali metal sulfide is sodium sulfide, the alkali metal hydroxide is sodium hydroxide, the reaction is carried out at a temperature within the range of about 240° C to about 270° C for a reaction time within the range of about 2 hours to about 8 hours.

* * * * *

UNITED STATES PATENT AND TRADEMARK OFFICE
CERTIFICATE OF CORRECTION

PATENT NO. : 4,038,261
DATED : July 26, 1977
INVENTOR(S) : Willie W. Crouch and James T. Edmonds, Jr.

It is certified that error appears in the above-identified patent and that said Letters Patent are hereby corrected as shown below:

Column 8, line 23, "aromaxic" should be --- aromatic --- and line 68, after "0.8" insert --- part ---.

*Signed and Sealed this*

*Twenty-ninth* Day of *November 1977*

[SEAL]

Attest:

RUTH C. MASON
*Attesting Officer*

LUTRELLE F. PARKER
*Acting Commissioner of Patents and Trademarks*